United States Patent [19]

Sinchok

[11] Patent Number: 4,763,866
[45] Date of Patent: Aug. 16, 1988

[54] FREE STANDING BASE

[75] Inventor: John D. Sinchok, Oconomowoc, Wis.

[73] Assignee: Keystone Metal Products Company, Hebron, Ill.

[21] Appl. No.: 158,242

[22] Filed: Feb. 19, 1988

[51] Int. Cl.⁴ .............................................. A47B 91/00
[52] U.S. Cl. .................................. 248/188.7; 248/528
[58] Field of Search .................. 248/188.7, 188.1, 158, 248/159, 519, 528, 529; 108/150, 153; 297/341; 403/253, 217, 218

[56] References Cited

U.S. PATENT DOCUMENTS

| | | | |
|---|---|---|---|
| 2,482,979 | 9/1949 | Isakson | 248/188.7 |
| 3,119,589 | 1/1964 | Coladonato . | |
| 3,236,485 | 2/1966 | Staples . | |
| 3,298,086 | 1/1967 | Gasser . | |
| 3,387,808 | 6/1968 | Metcalf . | |
| 3,637,179 | 1/1972 | Marschak . | |
| 3,863,876 | 2/1975 | Finklestein et al. . | |
| 3,877,669 | 4/1975 | Ambasz . | |
| 4,117,784 | 10/1978 | Piretti | 108/150 |
| 4,159,096 | 6/1979 | Chase | 248/529 X |
| 4,169,625 | 10/1979 | Petersen | 297/349 |
| 4,178,858 | 12/1979 | Ponzellini | 108/150 |
| 4,288,052 | 9/1981 | Scott . | |
| 4,511,108 | 4/1985 | Ponzellini . | |
| 4,712,758 | 12/1987 | Cuschera | 248/188.7 |

FOREIGN PATENT DOCUMENTS 2342915  5/1974  Fed. Rep. of Germany ... 248/188.7

Primary Examiner—J. Franklin Foss
Attorney, Agent, or Firm—Welsh & Katz, Ltd.

[57] ABSTRACT

A collapsible support stand is disclosed which has two sets of opposing legs extending radially from a hollow cylindrical hub support. The stand may be collapsed to a closed position where adjacent legs are substantially parallel or to an open position where adjacent legs are substantially perpendicular to one another. A pair of opposing legs form an integral unit with a hollow cylindrical center joining the two legs. Each of the remaining opposing legs form upper and lower circular collars, which fit about the upper and lower ends of the cylinder. The caps are secured about the circular collars to hold them in place and secure the stand while allowing the pivotal movement.

15 Claims, 1 Drawing Sheet

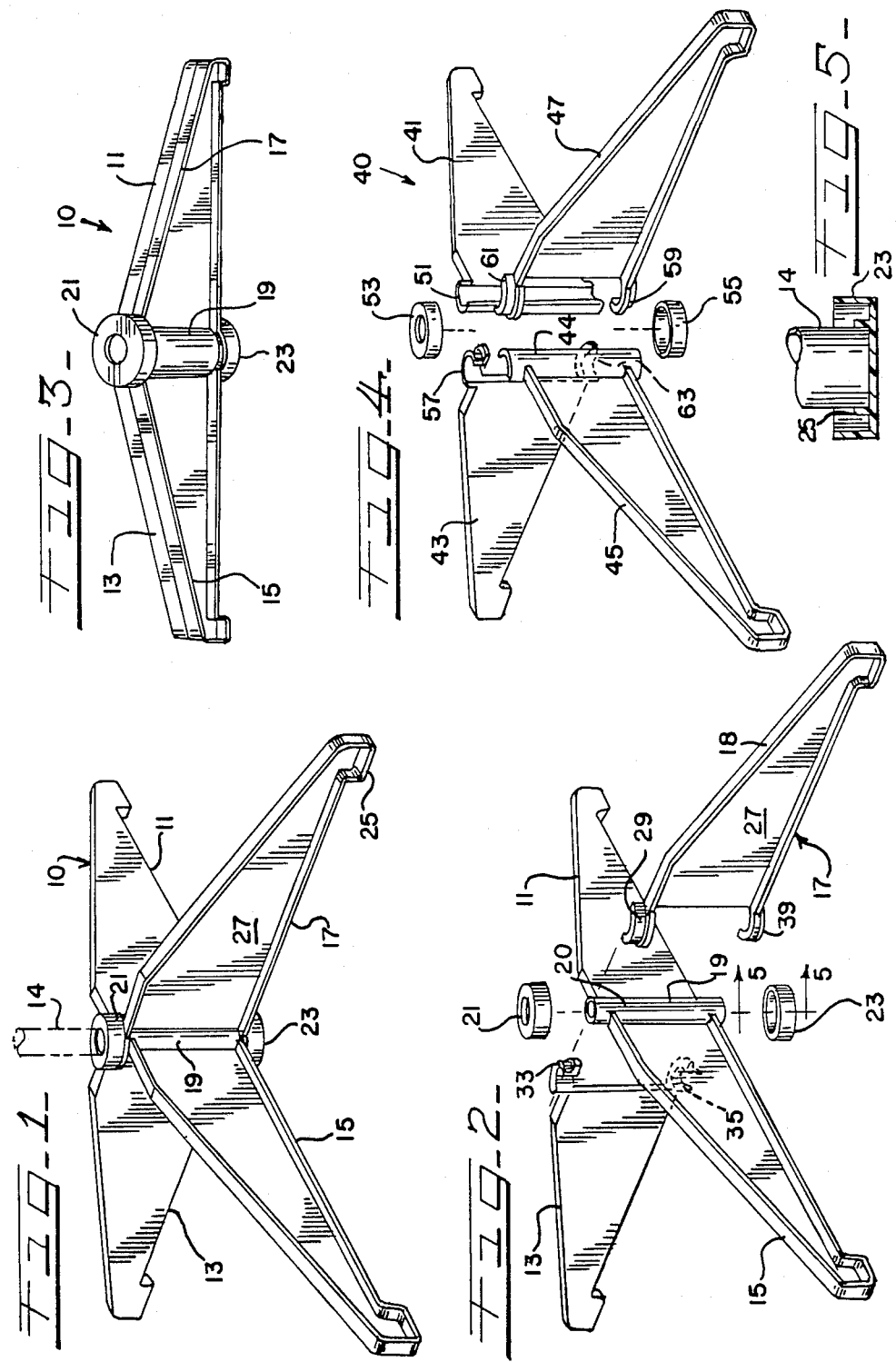

FREE STANDING BASE

BACKGROUND OF THE INVENTION

The present invention relates to a base, and more particularly, to a free standing support base for use in connection with merchandise displays and the like.

Collapsible stands having opposing legs radially extending from a central hub are known in the art. Such stands may be collapsed or set up by rotating or removing one pair of legs relative to another pair of legs to bring them to or from a given position with respect to each other. In general, the legs of such stands are interlocking, having locking tabs which define a detente slot for receiving and holding the legs in the given position.

SUMMARY OF THE INVENTION

Therefore, an object of the subject invention is an interlocking upright support with minimal parts and stable construction.

Another object of the subject invention is a collapsible stand, which is capable of being shipped in a collapsed assembled condition and easily placed in an operative position for yielding maximum support to a display or other item held by a pole.

These and other objects are attained by the subject invention wherein there is provided a collapsible stand having two pairs of legs extending radially from a central hub support. The legs are rotatable in a limited manner relative to one another about the center access of the hub and may be placed in a stable position in which each leg is generally perpendicular to an adjacent leg. Each leg comprises a generally flat planar vertical surface of a finite width. The four legs are joined at their center; two opposing legs join to form a cylindrical center and the other two opposing legs join to form, at the upper portion of the cylinder and the lower portion of the cylinder, upper and lower collars about the cylinder, with caps securing each collar in place about the cylinder. With the caps in place over the collars, the two opposing legs forming the collars are permitted to rotate, to a limited extent, about the cylindrical center, thereby allowing movement of the legs from a generally parallel position with one another to a position where each leg is perpendicular to an adjacent leg.

BRIEF DESCRIPTION OF THE DRAWAINGS

FIG. 1 is a perspective view of a preferred embodiment of the collapsible support stand shown in its set-up and upright position.

FIG. 2 is a exploded perspective view of the collapsible stand of FIG. 1.

FIG. 3 is a perspective view of the colapsible stand of FIG. 1 showing the stand in an assembled form with its legs in a parallel position.

FIG. 4 is an exploded view of a second embodiment of the subject invention.

FIG. 5 shows a cross-section of the lower cap member.

DETAILED DESCRIPTION OF THE DRAWINGS

Referring now to FIG. 1, there is shown a support structure 10 which may be used for supporting a merchandise display or other objects supportable by means of a pole or the like. The support structure 10 comprises a plurality and preferably four radially extending legs 11, 13, 15, and 17 disposed about a central hub 19 and having an upper cap element 21 and lower cap element 23 securing legs 13 and 17 to the central hub 19 in a pivotal manner. At least upper cap 21 has a central opening 16 in its top wall for access by a pole support 14 or the like. Each leg is generally similar in its outer portions, and therefore, only one will be generally described herein, with the differing portions being described in detail.

Leg 17 may be in any suitable shape such as a rectangle or the like. However, it has been found that a generally planar triangular shape, such as shown in FIG. 1, is generally preferable in terms of strength and economy of materials. The leg may be molded of any suitable plastic, such as polyvinylchloride, polystyrene, polyethylene, polypropylene, or the like. In the alternative, the leg may be formed of a stamped metal, such as steel. An extended portion 25 provides for contact with the ground at the furthest point on the leg 17 from the central hub 19. Leg 17 comprises an outer flange 18 surrounding at least one side panel 27 and may have a thickness of up to an inch or more. However, it is preferably approximately ¾ of inch for added strength and stability while maintaining economy of material. Side panel 27 provides added strength against twisting or the like, and further, give an added appearance of strength.

The central hub portion 19 comprises a central portion integrally connected to each of two opposing hub legs to form a unitary whole. The central portion 19 presents a cylindrical outer surface. While more than two hub legs may be used to form the central hub portion, two have been found most efficient. The other legs are secured to this central portion in a manner to be explained. Central portion 19 is hollow in order to accept a pole or other support stand upon which a display stand or like article may rest.

Opposing pivot legs 13 and 17 each have mating semi-circular collars at an upper and lower end. If more than two opposing pivot legs are used, then the mating collars each form an equal fraction of a whole collar. In FIG. 2, more specifically, pivot leg 17 has an upper semi-circular collar 29 and a lower semi-circular collar 39 which mate with upper semi-circular collar 33 and lower semi-circular collar 35 on pivot leg 13 to form whole circular collars when the collar ends are joined. In use, the semi-circular collars are joined or mated to form a complete collar about the central hub portion 19. Upper cap 21 is placed about the circular collar thus formed by the mating semi-circular portions 29 and 33 to hold them together in that position. Lower cap 23 is similarly placed about the circular collar formed by the semi-circle collar portions 31 and 35. Caps 21 and 23 may be held in place by any number of means, such as the application of an adhesive, detente means, or other fastening means known in the art.

The opening 16 of the upper cap 21 may be of different sizes for accommodating support poles of varying sizes. The lower cap 23 may also have an opening of the same size as upper opening 16. In the alternative, the lower caps may have an internal, upstanding flange 25 are shown in FIG. 5 to secure, hold, and stabilize the support pole 14 in the base. It is also possible to make the lower cap identical to the upper cap, thereby reducing the number of different parts to be made.

With caps 21 and 23 in place over the upper and lower collar, legs 13 and 17 are pivotally joined to legs 11 and 15, thereby permitting pivotal movement from a perpendicular stance where each leg is perpendicular to each adjacent leg to a parallel position where each leg is parallel to an immediately adjacent leg. The legs may be restricted from movement to more than a 90° position by use of a detente 20 on the central portion 19. In the alternative, other locking or retention means may be used.

In a further embodiment of the subject invention, a collapsible support stand may be formed with four discrete leg sections, as opposed to the three discrete leg sections set forth and described in FIGS. 1, 2 and 3. In this embodiment, legs 41, 43, 45, and 47 may have the same general configuration as described above. However, the central cylindrical hub portion is formed of two halves 49 and 51, which are secured together to form a whole two piece cylinder prior to placement of the semi-circle collar portions 57, 59, 61, and 63 thereabout. The semi-circular collar portions 57, 59, 61, and 63 are similar and equivalent to the semi-circular collar portions shown in FIG. 2. With the semi-circular collar portions in place about the cylindrical hub portions 49 and 51, upper cap 53 and lower cap 55 may be placed about the collar portions thus formed and submitted as before. Thus, the legs are permitted to pivot from a position where adjacent legs are perpendicular, to a position where adjacent legs are parallel, similar to that described above and shown in FIG. 3.

The result of either of the above constructions is a collapsible stand which has relatively few and simple parts, thereby providng a low cost and yet very stable and effective stand or a display stand utilizing a central pole support.

Either embodiment can be made with essentially only two parts, legs 11 and 15 of FIG. 1 being integral, and legs 13 and 17 being identical. In the embodiment of FIG. 4, legs 43 and 47 are identical and legs 41 and 45 are identical. Thus for either form, only two parts, plus the caps, need to be manufactured, a significant cost savings.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Thereof, it is intended that the inventoin not be limited to the particular embodiment disclosed as the best mode contemplated for carrying out this invention, but that the invention will include all embodiments and equivalents falling within the scope of the appended claims.

Various features of the invention are set forth in the following claims.

We claim:

1. A support stand for use in supporting items on a pole or the like, comprisinkg an assembly of a first set and a second set of legs;
   each of said legs extending from an inner end to an outer ground engaging end portion;
   each leg of said first set of legs being opposite one another;
   said inner end of each of said first set of legs forming an upright hollow cylindrical central portion connecting said opposing legs;
   said inner end of each of said legs of said second set of legs forming, in combination, an upper collar and a lower collar about an upper end and a lower end respectively of said central portion;
   an upper cap for attachment about said upper collar;
   a lower cap for attachment about said lower collar;
   said upper cap having an opening in a top wall thereof for the acceptance of said pole into said hollow central portion; and
   said upper and lower caps maintaining said support stand in assembled condition while permitting pivotal movement of said second set of legs about said central portion from a closed position to an open position.

2. The support stand of claim 1, wherein said first set of legs and said second set of legs comprise a total of four legs.

3. The support stand of claim 1, wherein each leg of said first set of legs is identical to one another and each leg of said second set of legs is identical to one another.

4. The support stand of claim 1, wherein each leg of said second set of legs is identical in construction.

5. The support stand of claim 1, wherein in said closed position, each leg of said first set of legs is parallel to a leg of said second set of legs.

6. The support stand of claim 1, wherein in said open position, each leg is substantially perpendicular to an adjacent leg.

7. The support stand of claim 1, wherein said legs are formed of plastic.

8. The support stand of claim 1, wherein said upper and lower caps are secured to said upper and lower collars by retention means.

9. The support stand of claim 6, wherein said retention means comprises an adhesive.

10. The support stand of claim 6, wherein said retention means comprises detente means.

11. A plastic support stand for use in supporting items or a pole or the like, comprising a first pair of legs and a second pair of legs;
    each of said legs being of a generally planar triangular shape and extending from an inner end to an outer ground engaging end portion;
    said first pair of legs being opposite one another;
    said inner ends of each of said first pair of legs forming an upright hollow cylindrical central portion connecting said opposing legs;
    said inner ends of said second set of legs forming, in combination, an upper circular collar and a lower circular collar about an upper end and a lower end respectively of said central portion;
    an upper cap secured about said upper collar;
    a lower cap secured about said lower collar;
    said upper cap having an opening in a top wall thereof for the acceptance of said pole into said hollow central portion; and
    said upper and lower caps maintaining said support stand in assembled condition while permitting limited pivotal movement of said legs relative to one another from a closed position to an open position.

12. The stand of claim 11, wherein said lower cap comprises a planar circular surface, a side wall depending therefrom, and an interior flange depending from said planar surface and concentric with said side walls.

13. The stand of claim 12, wherein said interior flange is of a size that will securely hold said pole.

14. The stand of claim 11, wherein said second pair of legs are identical in construction.

15. The stand of claim 11, wherein said first pair of legs are identical in construction.

* * * * *